Feb. 23, 1932.　　　　G. TANNER　　　1,846,621
SAW MILL CARRIAGE
Filed March 23, 1931　　2 Sheets-Sheet 1
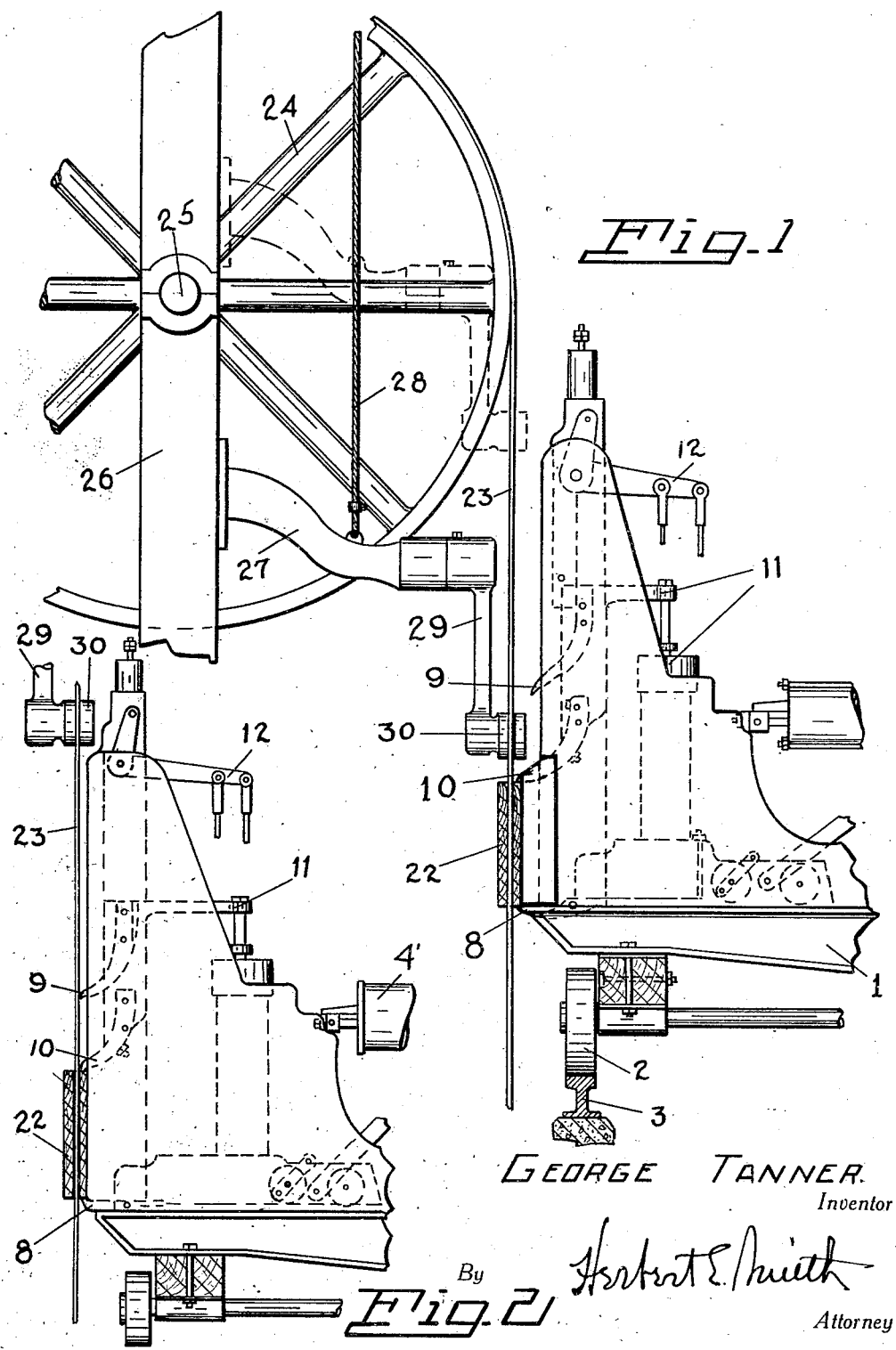
George Tanner.
Inventor
By Herbert E. Smith
Attorney Feb. 23, 1932.                G. TANNER                1,846,621
                             SAW MILL CARRIAGE
                    Filed March 23, 1931    2 Sheets-Sheet 2
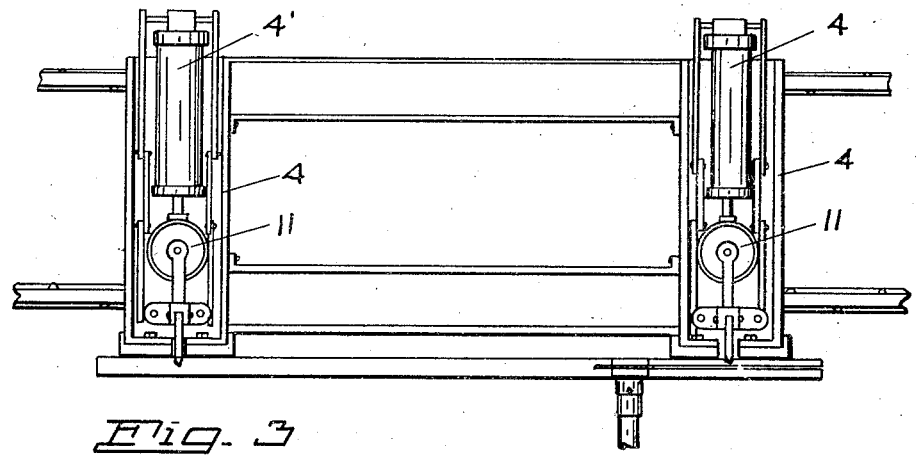
Fig. 3
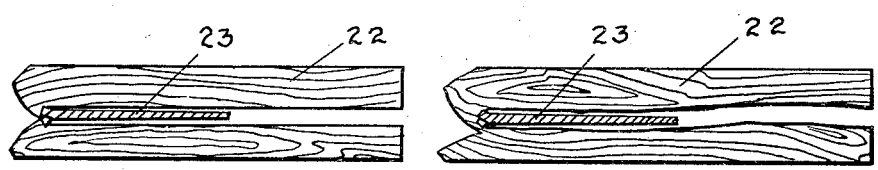
Fig. 4                    Fig. 5
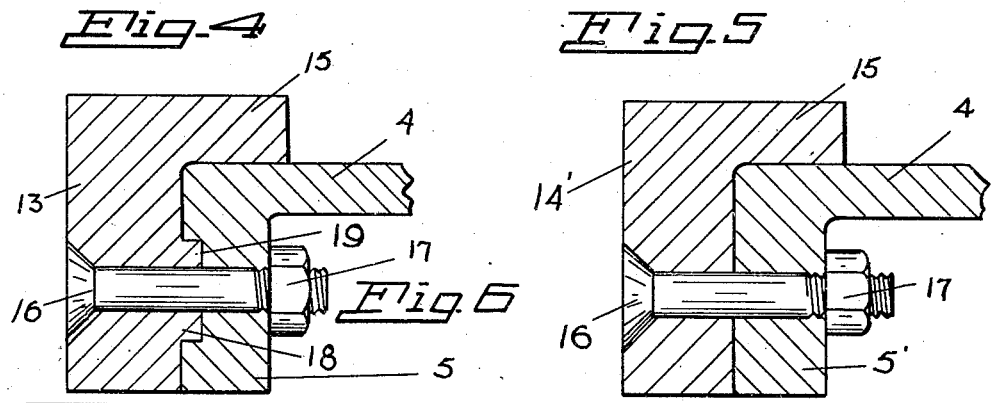
Fig. 6                    Fig. 8
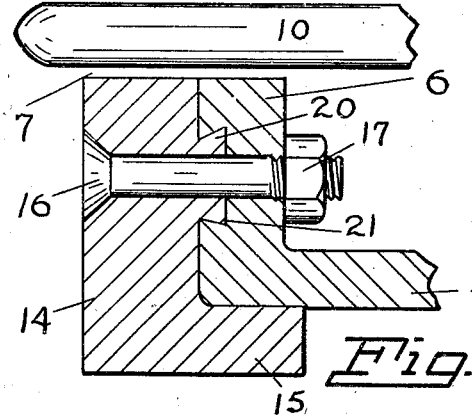
Fig. 7
GEORGE TANNER
           Inventor
By Herbert E. Smith
           Attorney Patented Feb. 23, 1932

1,846,621

UNITED STATES PATENT OFFICE

GEORGE TANNER, OF SANDPOINT, IDAHO

SAW MILL CARRIAGE

Application filed March 23, 1931. Serial No. 524,422.

My present invention relates to improvements in saw mill carriages and especially in the construction of the knees of the carriage against which the log or cant is held by the dogging mechanism. As is well known, the carriage reciprocates on rails, and the knees are reciprocated transversely of the carriage, to feed the log or cant broadside, to the saw, but under existing conditions, in the saw mills with which I am familiar, the last two boards or planks sawed from the log or cant are of less value than the previously cut planks or boards, and thereby a loss is sustained in the operation of the saw mill. Under existing conditions, if the last cut on the log is made without interrupting the operation of the carriage and saw, the last two boards or planks are inaccurately and irregularly sawed, thus reducing the value of the lumber cut from the log. In order to secure an accurate and regular cut for the two last planks it is now the custom to stop the carriage and the saw mechanism and then adjust the sawing mechanism for the last cut. When the operation of the saw mill is thus slowed down, or stopped, the time consumed for the adjustment for each log is lost, and thereby the efficiency of the sawmill is lowered and the cost of manufacturing the lumber is increased.

By the utilization of the improvements of my invention, slackening up in operations, or cutting the speed of the operations is eliminated, adjustments during the operation of cutting a log are avoided, and a steady and uniform operation of the saw mill is insured to save time and material.

The primary object of my invention is the provision of means on the knees of the saw mill carriage by means of which the log or cant is retained by the dogging mechanism in such position with relation to the knees and the saw, that the latter may automatically be adjusted without loss of time, not only during the usual cuts, but down to and including the last cut of the log, thereby insuring that the two last planks or boards shall be as regular and uniform as the previously cut slabs.

The invention consists in certain novel combinations and arrangements of parts as will hereinafter be more fully set forth and claimed. In the accompanying drawings I have illustrated one complete example, (with slight modifications) of the physical embodiment of my invention wherein the parts are combined and arranged according to the best mode I have thus far devised for the practical application of the principles of my invention.

Figure 1 is a detail view transversely of the carriage and cant, showing part of one of the knees and part of the sawing mechanism with its automatically adjusted saw guide, according to my invention.

Figure 2 is a similar view on a reduced scale showing the parts as now, or previously used in saw mills, without the improvements of my invention.

Figure 3 is a top plan view showing two spaced knees of the carriage and illustrating the saw cutting through the cant.

Figure 4 is a detail view showing the saw making its last cut in the cant according to my invention, and Figure 5 is a similar view showing the operation of the saw, without the improved features of my invention.

Figures 6 and 7 are complementary, horizontal sectional views through the face plates of knees showing two forms of my invention, and Figure 8 is a similar view showing another form of the invention.

In order that the relation and arrangement of parts, and the utility of the invention may readily be understood I have shown in Figures 1 and 2 parts of a saw mill carriage including the head-block or bolster 1 with its rollers or wheels 2 traveling on the rails 3, and the knees 4, which are disposed transversely of the carriage are reciprocated by power from the tapering cylinder 4'.

The knees are provided with upright, spaced, face plates 5 and 6 as in Figures 6 and 7, or 5' as indicated in Figure 8, and between the complementary face plates a groove 7 is provided for the accommodation of the dogs that hold the log or cant. At the bottom of the groove of the face plates the usual fixed dog 8 is provided, and the upper dog 9 and lower dog 10 co-act with the fixed dog when handling large and smaller logs respectively.

The dogs 9 and 10 are vertically adjusted by the dogging mechanism indicated at 11, and horizontal adjustment is secured through the mechanism actuated by pneumatic pressure from the cylinder and mechanism 12 of Figures 1 and 2.

As shown in Figures 6, 7, and 8 respectively the face plates are provided with wear plates 13, 14 and 14' located at the bottoms of the plates and offset from the front faces of the plates. These wear plates are angular or L-shaped in cross section and their flanges 15 project laterally at the sides of the knees and lie snugly against the sides of the knee for the purpose of rigidly bracing the plates and resisting strains as the log is held against the wear plates by the dogs.

In addition to the bracing flanges 15, the wear plates are secured to the face plates by means of bolts 16 and nuts 17, the former passing through bolt holes in the wear plates and face plates and the latter being located within the hollow knee. The heads of the bolts are countersunk in the wear plates and the faces of the bolt-heads are flush with the faces of the wear plates to insure a smooth wear-face for the wear plates against which the log is held.

To insure a more rigid and rugged construction or joint between the wear plates and the face plates, the wear plate 13 in Figure 6 is provided with a vertically arranged tongue 18 that fits into complementary groove 19 of the wear plate, and in Figure 7, the wear plate 14 is provided with a dovetail tenon or tongue 20 that slides into the complementary undercut groove 21 of the face plate.

The log or cant is indicated by the numeral 22, and the saw band 23 of the band saw is supposed to be making its last cut in the several figures of the drawings, in which the cant is shown as retained against the wear plates of the spaced knees by means of the dogs 8 and 10.

The band saw passes around a pair of pulleys or wheels, the upper one of which is indicated at 24, and its arbor or shaft 25 is journaled in bearings of the stationary support 26. As the saw band passes downwardly in front of the knees and carriage and through the moving log, the saw is automatically adjusted, or guided by an automatically adjusted device, to insure a regular and accurate kerf in the cant, even to the last cut.

The saw guide includes an automatically, vertically adjustable bracket 27 slidable in the support 26, and the adjustment is regulated and governed by a weight to which the cable 28 of the bracket is attached.

The bracket has a guide arm 29, and on the end of the arm is mounted the saw guide 30 through which the band passes and by which it is guided and held in its proper path.

In Figure 2 it will be seen that the saw guide 30 is prevented from being lowered below the top of the knee because the knee forms an obstruction thereto, and therefore the saw band cannot be guided adjacent the cant 22, with the result that a kerf similar to that of Figure 5 is cut in the cant as the last cut is made under conditions previous to the use of my improvements.

Figure 1 shows the use and advantage of my improved knee structures, where the cant 22 is held against the offset wear plates by the dogs, and the main body of the knee is in position to permit free, automatic movement of the saw guide 30 in front of the face plates, and the saw guide has automatically descended to its proper position to effectively guide the saw on its last cut, thereby producing a smooth, regular and uniform kerf, as in Figure 4. In Figure 5, the saw is free to follow the grain of the wood with the result that the kerf is irregular, while in Figure 4 the saw band is guided and held against lateral movement, with the result that the kerf is smooth and regular as explained.

Due to the arrangement of parts according to my invention, it will be apparent in Figure 1 that the adjustable saw guide is free to automatically adjust itself with relation to the saw band and the diminishing diameter of the log being cut, even to the last cut, thus eliminating either the operation of elevating the guide, or of producing dimension lumber. Thus the last two boards or planks cut from the same log are the same as the previously cut planks or boards with regard to regularity and thickness.

Having thus fully described my invention, what I claim as new and desire to secure by Letters Patent is:—

1. In a machine as described the combination with a band saw and an automatically, vertically adjustable saw-guide, of a knee and spaced faceplates thereon, a pair of dogs mounted between the face plates and operating means for the dogs, a removable wear plate rigidly mounted on each face plate, and said wear plates having their upper edges below the range of movement of the saw guide.

2. In a machine as described the combination with a band saw and an automatically, vertically adjustable saw-guide, of a knee and spaced face plates thereon, a pair of dogs mounted between the face plates and operating means for the dogs, a wear plate mounted on each face plate and a flange on each wear plate for co-action with a face plate, and bolts for securing the wear plates on the face plates, said wear plates having a height limited with reference to the plane of the adjustable saw guide.

In testimony whereof I affix my signature.

GEORGE TANNER.